United States Patent Office 3,425,146
Patented Feb. 4, 1969

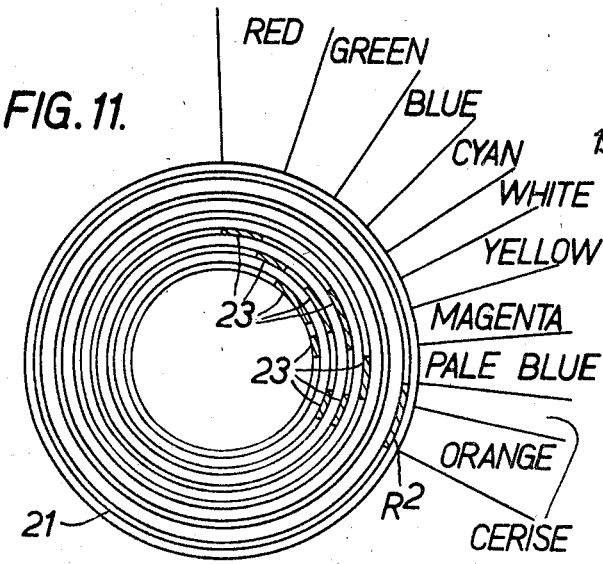
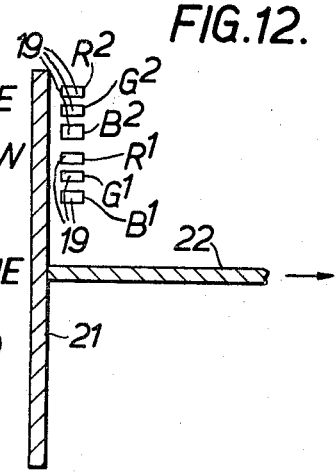
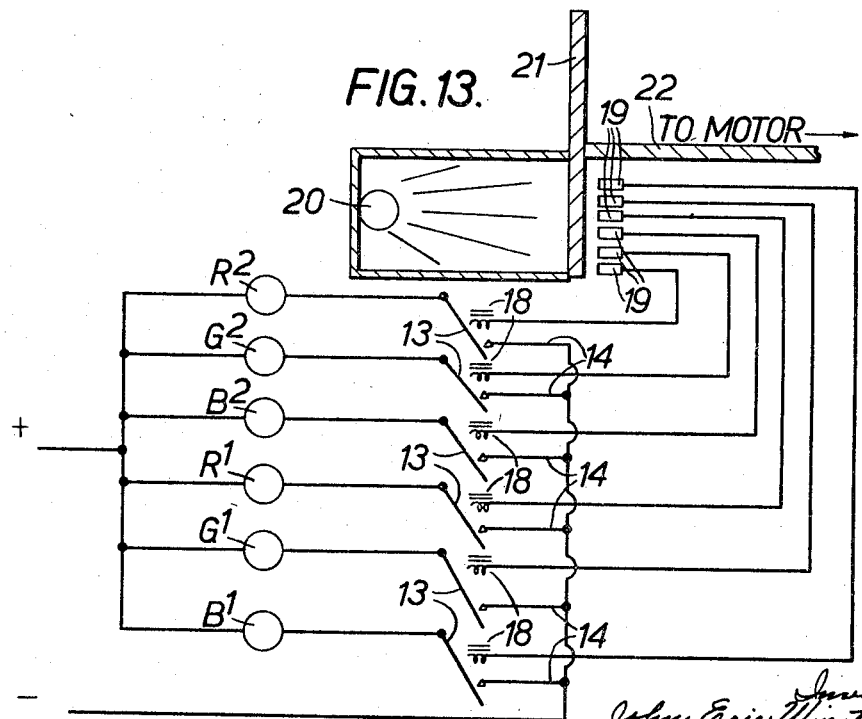

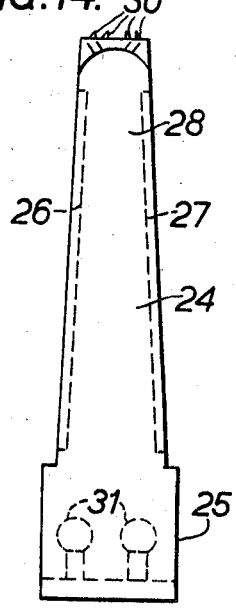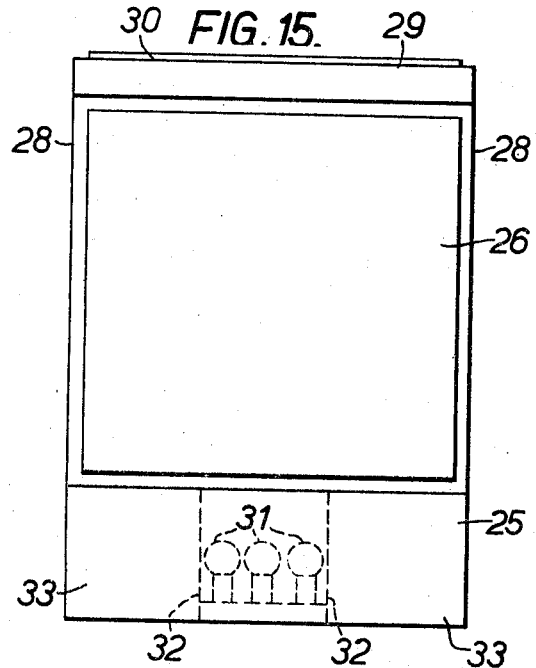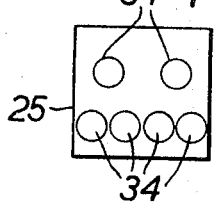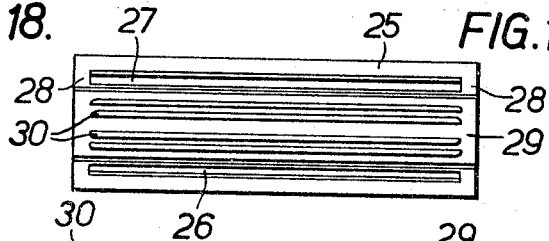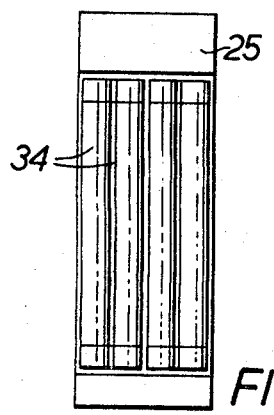

3,425,146
COLORED LIGHT APPARATUS
John Eric Winstanley, 45 Shepherds Close,
Chadwell Heath, Essex, England
Filed Oct. 8, 1965, Ser. No. 494,203
U.S. Cl. 40—132                                8 Claims
Int. Cl. G09f 13/04; F21p 5/02

ABSTRACT OF THE DISCLOSURE

Apparatus for producing colored light effects, comprising a compact arrangement of at least three differently colored light sources in a preliminary section of a mixing chamber formed by a wall closely surrounding the light sources and having a matt-white coated interior surface. The light passes from this section to a second diffusion section, the wall of which has at least one aperture and a thermoplastic opalescent screen covering the aperture. Sequentially operating switch means are provided which operate in predetermined time sequence to energize the light sources. Preferably the first section is offset so that the light sources are arranged out of the line of normal vision of the screen. Alternatively, the light source group is closely encircled by a cylinder having an internal matt-white surface and arranged in the rear of the diffusion chamber behind the opalescent screen so as to obtain uniform illumination of the screen.

---

The present invention relates to apparatus for producing colored light effects such as for advertising or other signs, for color indicating or testing, signalling, light projection, vari-colored illumination and variety of other purposes.

The invention has as its object to provide apparatus which will permit of the display or projection of changing color effects.

The apparatus according to the invention comprises a diffusion chamber containing a close arrangement of differently colored light source and providing a light diffusion surface which consists of or comprises at least one opalescent screen and substantially encloses the said light sources, the light sources being so arranged in the chamber with regard to the screen that light sources of different color can be simultaneously energized and the light therefrom mixed in the chamber and illuminate the screen with the mixed color, and sequentially-operated switch means whereby the light sources may be energized in different combinations to produce different color mixtures.

The switch means may be operative so that the light sources made periodically be displayed singly on so that there are brief periods when all lights of extinguished.

Where said diffusion surface is constituted only partially by the opalescent screen(s), as may be the case, e.g., with an advertising or other sign, the said opalescent screen(s) may form one or more walls of the chamber and the remaining wall or walls may have a matt-white interior surface or surfaces completing the diffusion surface. Where the diffusion chamber is completely, or more or less completely, formed by the screen(s), as may be the case, e.g., in changing color illumination, the screen(s) may be in the form of a sphere or part sphere.

The light sources may be electric incandescent lamps with colored bulbs or associated with filters or other means for coloring the light therefrom.

Where it is desired that the screen should be plane or otherwise intended to be viewed from within a limited angle, the screen may be positioned in or over an opening in an opaque-walled chamber and in this case the inner surface or surfaces of the chamber is or are formed to cause diffuse reflection of the light, as by providing that surface or surfaces with a matt-white coating or with other diffuse-reflecting media. The said chamber may be of square or rectangular cross-section with its top, bottom and side walls converging from said screen to said light sources.

Means may be provided within the chamber for effecting an initial diffusion or reflection of light from the said light sources. Although ideally such means may comprise an opalescent sphere surrounding the light sources it has been found in practice that good results are obtained when such means comprise a cylindrical ring encircling the light sources and having a matt-white or othe diffuse-reflecting inner surface.

The lamps may form a trichromatic series, preferably with sufficient lamps for each color of such series to be emitted in different tints or tones. For example the colors chosen may be red, green and blue and there may be two tints or shades of each such color.

The said switch means may be either manually and/or automatically controlled so that individual lamps and/or different combinations of lamps may be energized in any desired sequence. Where the switch means is automatically controlled rapid changes in the color uniformly displayed by the screen can be produced and a wide variation of the color so displayed obtained.

The switch means may comprise micro-switches and may be automatically actuated in any desired or convenient manner such as by rotary cam means or solenoids energized by photoelectric cells.

The switch means may be such that, or means may be incorporated therewith whereby, the wattage of any or all of the light sources may be varied in such a manner that subtle variations in color may be achieved especially in the mixed colors.

A light-transmitting filter or filters may be associated with the opalescent screen(s) and such filter(s) may define letters, designs, or other indicia to be displayed. The filter(s) may vary in color in different letters or parts of the indicia to be displayed and may be separate members appropriately secured to or mounted in relation to the screen(s) or they may be painted on the screen(s) in light-transmitting colored paints. When the light diffused over the screen(s) is of the same hue as that of the filter(s) the colors will appear to blend optically and any indicia defined by the filter(s) will not be readily discernible whereas when the light diffused over the screen is such as to differ from that of the filter(s) then the indicia defined thereby will appear to change hue and be more clearly or sharply defined.

An opaque screen, e.g., a black screen, with stencilled or cut-out indicia may be placed in front of the opalescent screen(s) in which case such indicia will appear to change hue as the color of the light diffused over the opalescent screen(s) changes. If such cut-out portions are fitted with light transmitting filters, the indicia will appear to change in hue while if certain combinations of diffused light and filter colors are used the designs or parts thereof may be arranged to disappear optically.

It is thus possible to obtain a wide variety of color effects while the correct choice of diffused light and filter colors animation may be produced by a repetition of figures or characters cut-out in the opaque screen and fitted with colored filters such that each or some of the figures or parts thereof may be illuminated or disappear optically according to the color of the diffused light to give the appearance of movement.

If desired periods may be interposed when all the light sources are extinguished to give intermittency in display.

Slidable or interchangeable opaque screens or color filters may be used to vary the effect produced by the same apparatus or the switching arrangement may be variable or interchangeable to enable further variations or effects to be obtained.

When the invention is incorporated in light-projection apparatus a reflector or reflectors, e.g., a parabolic reflector, and/or a lens or lens system may be provided for concentrating and projecting the diffused light.

In order that the invention may be the more readily understood reference will hereinafter be made by way of example to the diagrammatic drawings which accompany the specification and in which.

FIGS. 11 and 12 diagrammatically illustrate an alternative switch mechanism and

FIG. 13 is a circuit diagram thereof.

FIG. 14 is an end elevation of another embodiment of display apparatus according to the invention.

FIG. 15 being a side elevation, FIG. 16 a plan view and FIG. 17 a perspective view thereof.

FIGS. 18 and 19 show in end elevation and sectional plan view respectively an alternative arrangement of the apparatus according to FIGS. 14 to 17.

Figure 20:
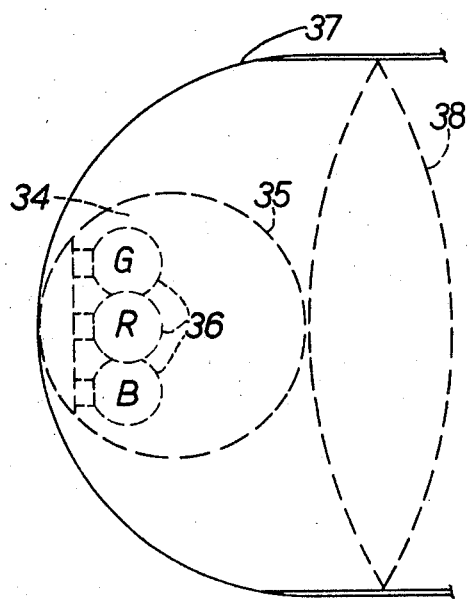
Figure 21:
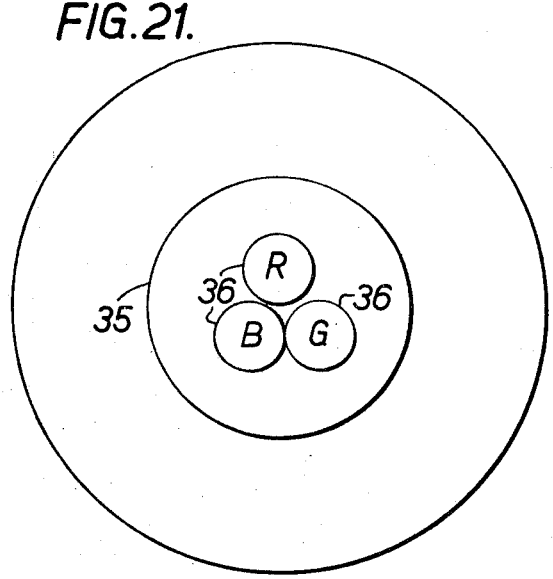

FIG. 20 is a side elevation of a light projection apparatus according to the invention and FIG. 21 is a front elevation thereof.

Figure 1:
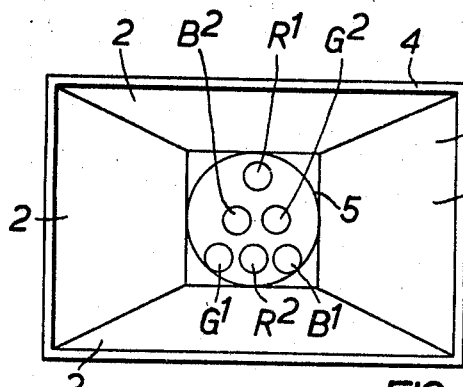
FIG. 1 is a front elevation of a display apparatus according to the invention with the opalescent screen removed to show the interior thereof.
Figure 2:
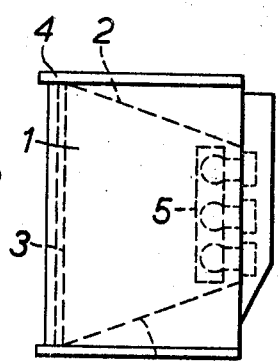
FIG. 2 is a side elevation.
Figure 3:
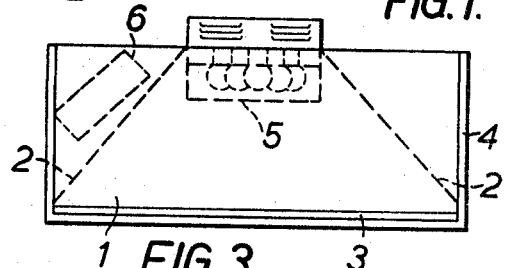
FIG. 3 is a plan view thereof.

Referring now to FIGS. 1, 2 and 3 it will be seen that the apparatus illustrated comprises a diffusion chamber 1 defined by converging top, bottom and side walls 2 having a matt-white interior surface and an opalescent screen 3, the walls 2 being partition walls in a cabinet or casing 4 and the screen 3 being removably mounted in guideways in the cabinet so that it can be removed in order that access may be had to the interior of the cabinet or so that the screen may be replaced as hereinafter described. The screen may be formed from a suitable thermoplastic acrylic material such as "Perspex Opal" of say 3/16" or so in thickness.

Mounted within the diffusion chamber are a trichromatic series of light sources, which in the illustrated embodiment are electric lamps having colored bulbs, comprising two red lamps $R^1$, $R^2$ of different shades or tints, two blue lamps $B^1$, $B^2$ of different shades or tints and two green lamps $G^1$, $G^2$ of different shades or tints. These light sources are closely grouped as shown and are surrounded by a cylindrical ring 5 having a matt-white or other diffuse-reflecting interior surface which serves to effect an initial diffusion of the light from the said light sources. As will be seen the lamps have been arranged so that they define an equilateral triangle with a lamp of different colors at each corner and a lamp of the same color at the center of the side opposite each corner. Although the lamps may be otherwise arranged good results have been obtained with this particular arrangement.

The light sources may be energized in any desired sequence and/or combination by a switch mechanism 6 mounted within the cabinet or casing 4.

It has been found that the screen shows a generally uniform diffused color no matter which lamp or combination of lamps is energized if 25 watt lamps are used and the screen is located at least 7" from the vertical plane containing the lamp filaments.

Figure 4:
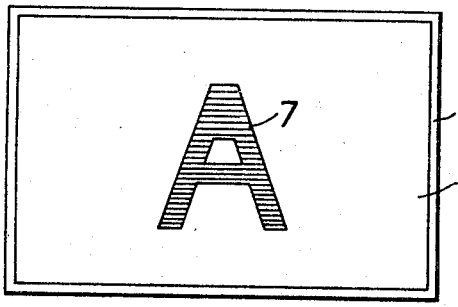
FIG. 4 is a front elevation and FIG. 5 an end elevation of an opalescent screen and color filter for use with apparatus according to FIGS. 1, 2 and 3 and FIGS. 6 and 7 are a front elevation and end elevation respectively of an alternative screen arrangement.
Figure 5:
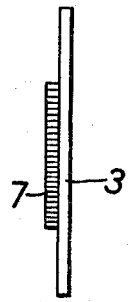

Referring now also to FIGS. 4 and 5 it will be seen indicia such as a letter or letters 7 can be displayed on the opalescent screen 3 by mounting a representation of such indicia thereon. Therefore each representation may be either opaque or in the form of a color filter and in the latter case the indicia can be arranged to show up in a different color or colors to the diffused light when the color of the diffused light differs from that of the filter(s) and to disappear optically when the color of the diffused light is of the same hue as that of the filter(s). The indicia may be mounted on the screen in any suitable manner either permanently as by adhesion or removably as by sliding in suitable guides or the indicia may be produced directly on the screen as by painting or dyeing with opaque or light transmitting paints or dyes or by tinting the screen. If desired different screens may be used to produce different effects.

Figure 6:
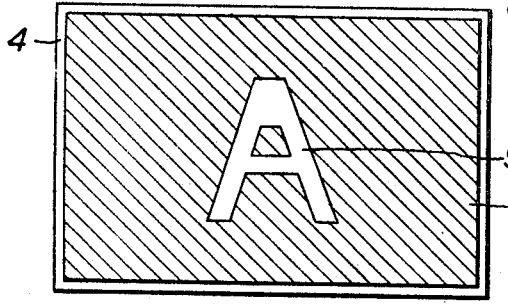
Figure 7:
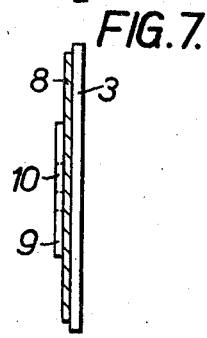

In the alternative embodiment shown in FIGS. 6 and 7 the opalescent screen 3 has mounted thereover an opaque, e.g., a black, screen 8 having letters or other indicia 9 cut out therein. If desired color filters 10 (FIG. 7) may be provided in or over said cut-out(s) and these filters may be of different colors so that different letters or part of the indicia will show up in different colors or disappear optically when the color of the diffused light is the same as that of the filter(s).

Figure 8:
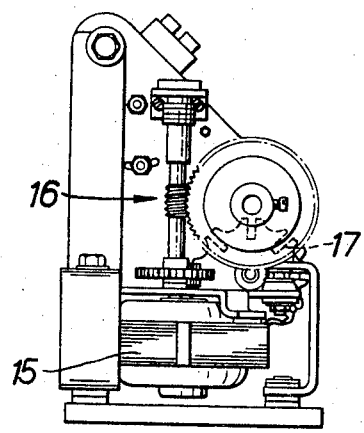
FIG. 8 is an end elevation and FIG. 9 a side elevation of a suitable switch mechanism for use with apparatus according to FIGS. 1, 2 and 3
Figure 9:
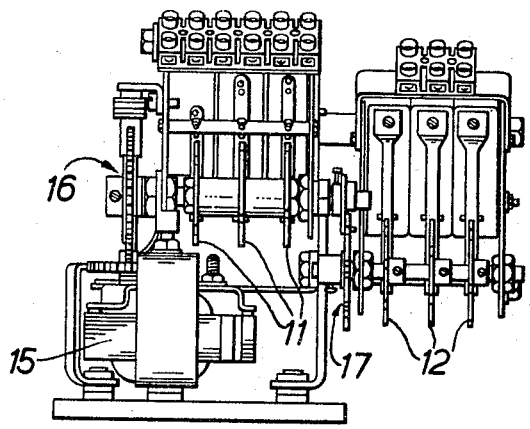
Figure 10:
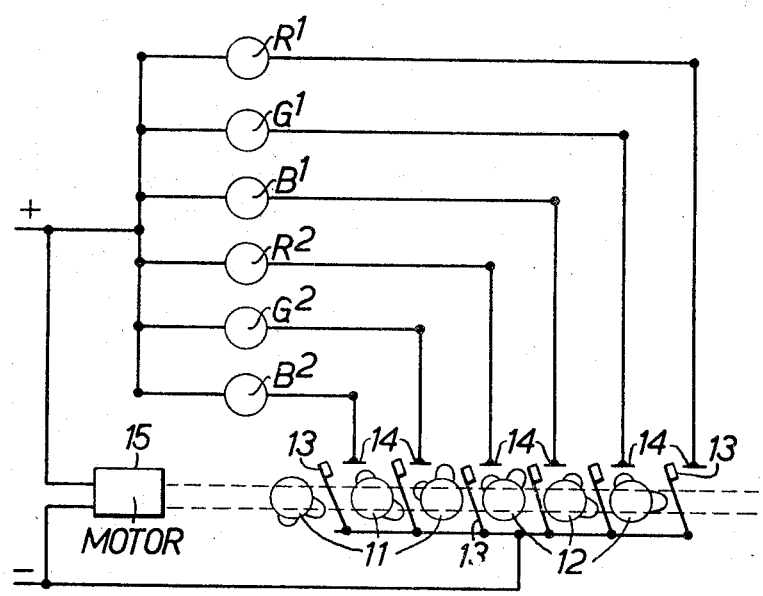
FIG. 10 is a circuit diagram of such a switch mechanism.

The switching arrangement may be either manually and/or automatically controlled and a suitable mechanical automatic control is shown in FIGS. 8, 9 and 10 which will now be referred to.

The switch mechanism illustrated comprises two series of peripheral cams 11, 12 arranged to move spring contacts 13 into electrical contact with cooperating stationary contacts 14 (FIG. 10), the cams 11 being driven by an electric motor 15 by way of reduction gearing 16 and the cams 12 by the electric motor 15 by way of reduction gearing 16 and Maltese cross device 17. The arrangement illustrated is such that when the apparatus is in operation the cams 11 make a complete revolution for each part revolution of the cams 12 and accordingly for each part revolution of the cams 12 the light sources $R^2$, $G^2$, $B^2$ are energized according to a sequence determined by the profiles of the cams 11 and this sequence is repeated for each stop position of the cams 12. Since depending on the cam profiles any single lamp or combination of lamps can be energized during the course of a display sequence it will be appreciated that a wide variety of color effects can be obtained. If desired the cams may be so profiled that periods are interposed when none of the light sources are energized so as to provide intermittency in display. It will, of course, be appreciated that the series of cams 11, 12 could be replaced by other cam means, e.g., by one or more cam means in the form of suitably profiled cylinders.

In the alternative switch arrangement shown in FIGS. 11, 12 and 13, in which like parts have been given like reference numerals, the spring contacts 13 are moved into electrical contact with the stationary contacts 14 by solenoids 18 which are energized under the control of photoelectric cells 19. Interposed between the photoelectric cells 19 and an activating light source 20 is a selector disc 21 mounted on a shaft 22 and rotated by an electric motor (not shown), the disc 21 being apertured at 23 so that light from the source 20 may impinge upon and energze the cells 19. Thus once again any single lamp or combination of two or more lamps may be energized during the course of a display sequence so that a great variety of color effects can be obtained, e.g., as is indicated in FIG. 11. The display sequence can, of course, be varied at will if the selector disc 21 is so mounted on the shaft 22 that it can be removed and replaced by a disc which is differently apertured.

Referring now to the embodiment shown in FIGS. 14 to 17, the apparatus thereon shown comprises a diffusion chamber 24 the lower part of which is defined by a box-like structure 25 having a matt-white interior surface and the upper part of which is defined by opalescent screens 26, 27 and walls 28 and top wall 29 which may, if desired, be provided with louvers 30 to promote air circulation through the apparatus to prevent overheating. The end walls 28 and top wall 29 are also preferably provided with matt-white interior surfaces. Mounted in the lower part of the diffusion chamber 24 are light sources 31 which may be under the control of switch mechanism as previously described.

Letters or other indicia may be displayed on the screens 26, 27 as previously described. It will, of course, be appreciated that if the apparatus illustrated is intended for viewing from one side only then one of the screens 26, 27 may be replaced by a side wall or an opaque screen having a matt-white interior surface.

If it is desired to accommodate the switch mechanism, spare lamps or the like within the apparatus then part of the box-like structure 25 may be partitioned off as shown at 32 to provide one or more compartment 33.

In the modified embodiment shown in FIGS. 18 and 19 (in which the upper part of the apparatus has been omitted) the light sources comprise fluorescent or neon tubes 34 instead of ordinary electric incandescent lamps as previously. The tubes 34 may themselves be colored or they may be associated with filters which color the light therefrom.

In the light projection apparatus illustrated in FIGS. 20 and 21, the diffusion chamber 34 is defined by a screen 35 in the form of an opalescent sphere, the colored light from the light sources 36 being collected by a reflector 37 which may be parabolic and projected through a convergent lens 38. The light sources 36 may be under the control of manual and/or automatic switch means as hereinbefore described and, if desired, a filter or filters may be provided, e.g., in front of the lens 38, through which the light is projected in order to vary or increase the color effects.

What I claim is:
1. Apparatus for producing colored light effects, comprising: a diffusion chamber, a close arrangement of at least three differently colored light sources therein, said chamber comprising a preliminary light mixing section bounded by a rounded matt-white surface closely surrounding said light sources, said section located within a further diffusion section which receives the premixed lights from said preliminary section and is defined by a casing with walls which diverge from said preliminary section to at least one aperture, and a thermoplastic opalescent screen covering said aperture; and sequentially operating switch means whereby in predetermined time sequence the light sources may be energized in different combinations of at least any two of said sources.

2. Apparatus according to claim 1, in which the light sources form a trichromatic series comprising the colors red, green and blue, and wherein there are six light sources providing two tints of each such color, said light sources being arranged to define an equilateral triangle of closely arranged sources with a light source of different colors at each corner and a light source of the same color at the center of the side opposite each corner source.

3. Apparatus according to claim 1 comprising an opaque screen having stencilled indicia therein adapted to be mounted in front of said opalescent screen and having colored light transmitting filters covering the stencilled indicia.

4. Apparatus according to claim 1 in which said light sources are contained within a cylinder forming said wall; said cylinder having a matt-white internal surface and a cross sectional area which is less than one-third the area of said screen, said light sources being wholly located behind said screen in the rear third of said chamber.

5. Apparatus according to claim 1 in which said light sources are in the trichromatic series red, green and blue.

6. Apparatus according to claim 1 in which said opalescent screen is of an acrylic thermoplastic material in the form of a plate approximately 3/16" thick.

7. Apparatus for producing colored light effects, comprising: a diffusion chamber, a close arrangement of at least three differently colored light sources therein, said chamber having a light-diffusing surface which comprises at least one opalescent screen and substantially encloses said light sources for mixing in said chamber the light of any plurality of said sources simultaneously energized; sequentially operating switch means whereby in predetermined time sequence the light sources may be energized in different combinations of at least any two of said sources, said chamber comprising a first portion containing said lamps and having light-diffusing walls and a second portion extending from said first portion, and at least one opalescent screen forming a wall of the second portion of said chamber, said opalescent screen arranged so that the light sources cannot be directly seen from any point on the opalescent screen viewed perpendicularly to said screen.

8. Apparatus for projecting colored lights comprising a diffusion chamber, a close arrangement of at least three differently colored light sources therein, said chamber comprising an opalescent wall surrounding the said light sources; a reflector within which said chamber is arranged; and a lens cooperating with said reflector to form a further chamber around said mixing chamber, and sequentially operating switch means whereby in predetermined time sequence the said light sources may be energized in different combinations of at least two of the said sources, and the mixed light transmitted by the said opalescent wall and reflector by said reflector through the said lens.

References Cited

UNITED STATES PATENTS

| 1,072,152 | 9/1913 | Ocampo. |
| 1,283,751 | 11/1918 | Hay. |
| 1,686,615 | 10/1928 | Balnojan _____ 40—132 |
| 1,872,154 | 8/1932 | Masek. |
| 1,888,406 | 11/1932 | Payberg. |
| 2,863,239 | 12/1958 | Glukes _____ 40—132 |
| 2,863,240 | 12/1958 | Glukes _____ 40—132 |
| 3,315,391 | 4/1967 | Lane et al. _____ 40—106.52 X |

EUGENE R. CAPOZIO, *Primary Examiner.*

RICHARD CARTER, *Assistant Examiner.*

U.S. Cl. X.R.

240—3.1, 10; 272—8